(12) United States Patent
Kuo et al.

(10) Patent No.: US 11,405,367 B1
(45) Date of Patent: Aug. 2, 2022

(54) SECURE COMPUTER PERIPHERAL DEVICES

(71) Applicant: NortonLifeLock Inc., Tempe, AZ (US)

(72) Inventors: Chengi Jimmy Kuo, Manhattan Beach, CA (US); Haik Mesropian, Glendale, CA (US); Petrus Johannes Viljoen, Manhattan Beach, CA (US); David Kane, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 261 days.

(21) Appl. No.: 16/358,491

(22) Filed: Mar. 19, 2019

Related U.S. Application Data (63) Continuation of application No. 15/648,880, filed on Jul. 13, 2017, now Pat. No. 10,284,530.

(51) Int. Cl.
| | |
|---|---|
| *H04L 9/40* | (2022.01) |
| *H04W 12/04* | (2021.01) |
| *G06F 21/85* | (2013.01) |
| *G06F 21/83* | (2013.01) |
| *G06F 21/60* | (2013.01) |
| *H04L 9/08* | (2006.01) |
| *H04L 9/30* | (2006.01) |

(52) U.S. Cl.
CPC ........ *H04L 63/0428* (2013.01); *G06F 21/606* (2013.01); *G06F 21/83* (2013.01); *G06F 21/85* (2013.01); *H04L 9/0861* (2013.01); *H04L 9/30* (2013.01); *H04W 12/04* (2013.01)

(58) Field of Classification Search
CPC ........ G06F 21/83; G06F 21/85; G06F 21/606; H04W 12/04; H04L 63/0428; H04L 9/0861; H04L 9/30
See application file for complete search history.

(56) References Cited

U.S. PATENT DOCUMENTS

| | | | |
|---|---|---|---|
| 8,826,028 | B1 | 9/2014 | Boyington |
| 9,344,281 | B2 | 5/2016 | Kobres et al. |
| 9,471,811 | B2 | 10/2016 | Kobres et al. |
| 9,584,532 | B2 | 2/2017 | Kobres et al. |
| 9,607,297 | B2 | 3/2017 | Ran |
| 9,871,771 | B2 | 1/2018 | Antonakakis et al. |
| 2013/0283397 | A1* | 10/2013 | Griffin ................. H04W 4/50 726/28 |
| 2015/0269369 | A1* | 9/2015 | Hamid ................. G06F 9/4401 726/5 |

FOREIGN PATENT DOCUMENTS

EP 2674888 A1 * 12/2013 ............. G06F 21/30

* cited by examiner

*Primary Examiner* — Beemnet W Dada
(74) *Attorney, Agent, or Firm* — Holland & Hart LLP (57) ABSTRACT

A method for improving security of peripheral devices is described. The method includes displaying, by a processor of a computing device, a code, receiving, by the processor, a user input after displaying the code, comparing, by the processor, the user input to the displayed code, and establishing, by the processor, secure communication between a peripheral device and a software application at the computing device based at least in part on a result of the comparing the user input to the displayed code.

16 Claims, 7 Drawing Sheets

SECURE COMPUTER PERIPHERAL DEVICES

CROSS REFERENCES

This application is a continuation of U.S. patent application Ser. No. 15/648,880 by Kuo, et al., entitled "SECURE COMPUTER PERIPHERAL DEVICES," filed Apr. 13, 2017, which application in its entirety is incorporated by reference into the present application.

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of malicious programs such as keyloggers, rootkits, spyware, trojans, and the like. Malware programmers are continually adapting to the improvements made in malware detection, which creates an ongoing cycle of malware techniques adapting to improvements in malware detection.

SUMMARY

According to at least one embodiment, a method for improving the security of peripheral devices is described. In one embodiment, the method may include displaying, by a processor of a computing device, a code, receiving, by the processor, a user input after displaying the code, comparing, by the processor, the user input to the displayed code, and establishing, by the processor, secure communication between a peripheral device and a software application at the computing device based at least in part on a result of the comparing the user input to the displayed code.

In one embodiment, the method may include sending, by a processor of a peripheral device, at least one packet of data to an operating system of a computing device, identifying, by the processor, execution of a software application on the computing device, performing, by the processor, a handshake protocol between the secure input device and the software application based at least in part on the execution of the software application, and establishing, by the processor, a secure session over a secure channel between the secure input device and the software application based at least in part on the handshake protocol. In some cases, the at least one packet of data may identify the peripheral device to the operating system as two or more peripheral devices. In some cases, the at least one packet of data may identify the peripheral device at least as a default input device and a secure input device.

In some cases, the peripheral device may include a universal serial bus (USB) peripheral device connected to the computing device. In some cases, at least one of the peripheral device and the software application may generate a session key for the secure session. In some embodiments, the method may include encrypting data generated from input received by the peripheral device based at least in part on the session key.

In some embodiments, the method may include communicating the encrypted data over the secure channel between the secure input device and the software application. In some cases, the software application may be a predetermined software application. In some examples, the method may include encrypting the session key using a public encryption key.

In some embodiments, at least one of the peripheral device and the software application may include a private encryption key to decrypt the encrypted session key. In some cases, the private encryption key may be provisioned on the peripheral device at a time of manufacturing in those embodiments where the peripheral device is configured to include the private encryption key.

In some cases, performing the handshake protocol may include displaying a code, receiving a user input after displaying the code, comparing the user input to the displayed code, and enabling the establishing of the secure session based at least in part on a result of comparing the user input to the displayed code. In some cases, the code may be displayed on a portion of a user interface of the software application or a display on the peripheral device, or both.

In some embodiments, upon establishing the secure session and while the software application controls focus of the operating system, the method may include implementing a secure driver associated with the secure input device and halting communications with a default driver associated with the default input device. In some embodiments, upon terminating the software application or upon the software application losing the focus, the method may include re-enabling communications with the default driver associated with the default input device and disabling the secure driver associated with the secure input device.

In some cases, the operating system may address communication to the default input device based at least in part on the first identifier. In some cases, the software application may address communication to the secure input device based at least in part on the second identifier. In some cases, the secure driver may bypass the operating system and communicates data directly between the software application and the secure input device. In some cases, the at least one packet of data may include a first identifier for the default input device and a second identifier for the secure input device.

A peripheral device configured for improving security of peripheral devices is also described. The computing device may include one or more processors and memory in electronic communication with the one or more processors. The memory may store computer executable instructions that when executed by the one or more processors cause the one or more processors to perform the steps of sending, by a processor of a peripheral device, at least one packet of data to an operating system of a computing device, identifying, by the processor, execution of a software application on the computing device, performing, by the processor, a handshake protocol between the secure input device and the software application based at least in part on the execution of the software application, and establishing, by the processor, a secure session over a secure channel between the secure input device and the software application based at least in part on the handshake protocol. In some cases, the at least one packet of data may identify the peripheral device to the operating system as two or more peripheral devices. In some cases, the at least one packet of data may identify the peripheral device at least as a default input device and a secure input device.

A computer-program product for improving security of peripheral devices is also described. The computer-program product may include a non-transitory computer-readable medium storing instructions thereon. When the instructions are executed by one or more processors, the execution of the instructions may cause the one or more processors to perform the steps of sending, by a processor of a peripheral device, at least one packet of data to an operating system of a computing device, identifying, by the processor, execution of a software application on the computing device, performing, by the processor, a handshake protocol between the secure input device and the software application based at least in part on the execution of the software application, and establishing, by the processor, a secure session over a secure channel between the secure input device and the software application based at least in part on the handshake protocol. In some cases, the at least one packet of data may identify the peripheral device to the operating system as two or more peripheral devices. In some cases, the at least one packet of data may identify the peripheral device at least as a default input device and a secure input device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 depicts a block diagram of a computer system suitable for implementing the present systems and methods; and While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to improving the security of computer peripheral devices. More specifically, the systems and methods described herein relate to improving computer peripheral device security in relation to the security of data communicated between an input device and a computing device and/or data communicated between an input device and an application installed or running on the computing device.

A peripheral may be any ancillary device used to put information into and get information out of a computing device. In some cases, there may be at least three different types of peripherals: input devices, which interact with or send data from the user to the computer; output devices, which provide output to the user from the computer; and input/output devices that perform both functions. Touchscreens are one example that combines different devices into a single hardware component that can be used both as an input and output device. Examples of peripheral devices may include at least one of keyboard, computer mouse, touchpad, tablet computer, graphic tablet, smartphone, smart watch, digital watch, light pen, computer display, printer, projector, computer speaker, tape drive, motion sensor, digital camera, digital video recorder, web camera, scanner, microphone, biometric device, barcode reader, smart card reader, musical instrument digital interface (MIDI) device, gamepad device, and joystick, or any combination thereof.

Keystroke logging, also referred to as keylogging or keyboard capturing, is the action of recording (logging) the keys struck on a keyboard, typically covertly, so that the person using the keyboard is unaware that their actions are being monitored. Numerous keylogging methods exist, which range from hardware and software-based approaches to acoustic analysis. Malware is known to intercept input from keyboards and mouse and thus steal such input via a process known as keylogging. Conventional antivirus systems have attempted to block keyloggers through many different techniques such as process detection, heuristics, virtual keyboards, etc. Each has been foiled by malware writers or are incomplete at thwarting keylogging.

The present systems and methods improve peripheral devices by incorporating enhanced firmware and communication protocols to enable secure input in secure processes that can smoothly switch between secure operation and non-secure operation. In some cases, the present systems and methods may establish multiple secure sessions between one or more peripheral devices and one or more software applications.

By incorporating enhanced firmware, peripheral devices may report themselves to an operating system as multiple input devices, such as a default input device (e.g., keyboard, mouse, etc.) and a secure input device (e.g., secure keyboard, secure mouse, etc.). In some cases, the peripheral device may include one or more default communication channels for communication between the default input device and the operating system. In some cases, the peripheral device may include one or more default communication channels for communication between the default input device and the operating system. In some cases, the peripheral device may include one or more secure communication channels for communication between the secure input device and one or more secure applications.

In one embodiment, when a secure process initiates, the improved peripheral device may establish a secure session with the secure input device. When the secure process owns the focus of the operating system, the secure process may signal the peripheral device to switch to a secure input device mode and to pass all of its communications through a secure channel associated with the secure session. When the secure process loses focus, the secure process may signal the peripheral device to return to the default input device mode. In some cases, multiple secure processes may activate and deactivate the secure input device of the peripheral device as a user transitions from one process to the next.

In one embodiment, a peripheral device reports itself to the operating system as multiple inputs. For example, the peripheral device may identify itself at least as a default input device and a secure input device. In some cases, the peripheral device may report the default input device using a first identifier and report the secure input device using a second identifier. From the point of view of the operating system, a default driver may be associated with the default input device and a new, secure driver may be associated with the secure input device. In some cases, the default driver may be a pre-existing driver that pre-exists the secure driver and/or the secure input device of the peripheral device. Accordingly, one or more processes configured to initiate and communicate to a secure input device using a secure channel may establish a secure session with the secure input device of the peripheral device.

In some embodiments, when a secure process initiates, the secure process may initiate a handshake protocol with the peripheral device to establish a secure key to use the peripheral device in secure input device mode. When secure process gains focus, the secure process may signal the secure input device to use only a secure channel for input/output in relation to the peripheral device. In some cases, when the secure process establishes the secure session with the secure input device of the peripheral device, the secure process becomes responsible for managing the cursor, positioning, and input of the peripheral device because the operating system is no longer receiving input from the peripheral device. Thus, while the secure process is in focus and is receiving input via the secure input device of the peripheral device, the operating system, and any other out-of-focus process, does not detect the input from the peripheral device. When the secure process loses focus, the secure process signals the secure input device to return input/output to its regular, default input device mode.

The present systems and methods improve peripheral devices, providing smooth transitions between secure transmissions and default, un-secure transmissions such that a user does not notice anything different happening in relation to his or her input via the peripheral device such as lag, a pause, jittery operation, etc. Moreover, when a secure process establishes a secure session between the secure input device of the peripheral device and the secure process and a user inputs data via the peripheral device, keyloggers are unable to capture the data the user inputs because the input data is encrypted before the input data even leaves the peripheral device.

Figure 1:
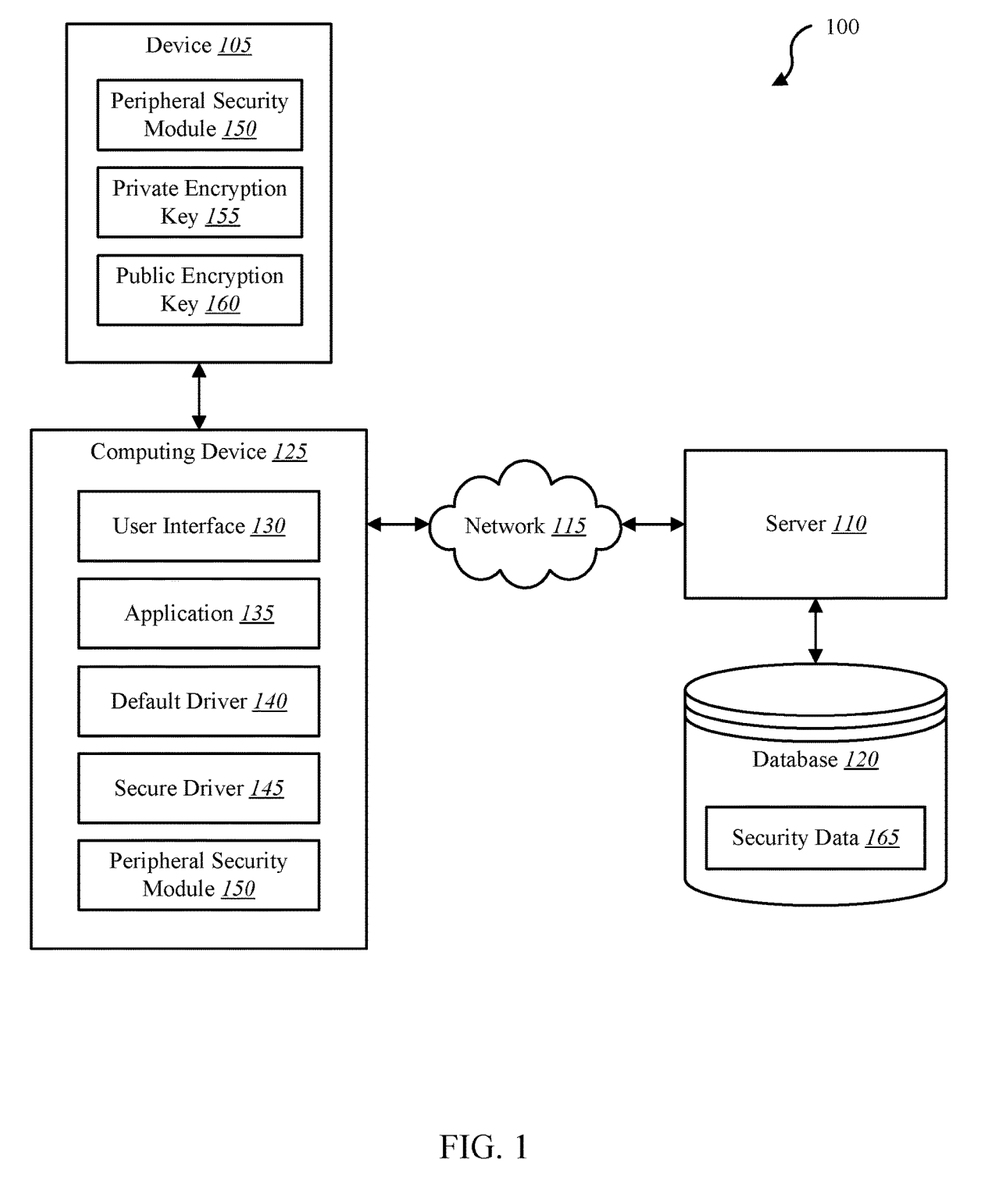
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a computing device 125, and a network 115 that allows the device 105, the server 110, and computing device 125 to communicate with one another.

Examples of the device 105 may include any combination of computer peripheral devices, mobile devices, smart phones, personal computing devices, computers, laptops, desktops, servers, media content set top boxes, digital video recorders (DVRs), or any combination thereof. In some cases, device 105 may include a computer input device such as at least one of a keyboard, computer mouse, touchscreen, touchpad, document scanner, digital camera, joystick, game pad, game paddle, steering wheel, gesture recognition device, light pen, track ball, digitizer, graphic tablet, microphone, magnetic ink card reader (MICR), optical character reader (OCR), bar code reader, optical mark reader (OMR), biometric device, fingerprint scanner, infrared remote control, automation sensor, motion sensor, image sensor, image scanner, laser rangefinder, eye gaze tracker, or any combination thereof. In some cases, device 105 may include any universal serial bus (USB) peripheral configured to connect to a USB port of a computing device.

Examples of computing device 125 may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof. Although computing device 125 is depicted as connecting to device 105 via network 115, in one embodiment, device 105 may connect directly to computing device 125. In some cases, device 105 may connect or attach to computing device 125 and/or server 110 via a wired and/or wireless connection. In some cases, device 105 may attach to any combination of a port, socket, and slot of computing device 125 and/or server 110.

In some configurations, the device 105 may include peripheral security module 150, private encryption key 155, and public encryption key 160. Although the components of the device 105 are depicted as being internal to device 105, it is understood that one or more of the components and/or copies of one or more of the components may be external to the device 105. In some cases, one or more devices may connect to device 105 through wired and/or wireless connections.

In some configurations, computing device 125 may include a user interface 130, application 135, default driver 140, secure driver 145, and peripheral security module 150. In some cases, application 135 may include a secure software application configured to enable secure communications between device 105 and computing device 125. In some cases, a user may download and/or install at least one of default driver 140 and secure driver 145 on computing device 125. In some cases, at least one of default driver 140 and/or secure driver 145 may be stored on device 105 and/or installed on computing device 125 via device 105.

In some embodiments, application 135 may include a secure software application running and/or installed on computing device 125 and/or server 110. In some cases, application 135 may include an unsecure software application configured to enable default, unsecured communications between device 105 and computing device 125. In some cases, application 135 may employ secure driver 145 to establish secure communications between application 135 and device 105. In some cases, application 135 may employ default driver 140 to establish default, unsecure communications between application 135 and device 105.

In some embodiments, application 135 may be installed on computing device 125 in order to allow a user to interface with a function of device 105, peripheral security module 150, computing device 125, and/or server 110. Examples of application 135 may include a software application installed on and/or executing on a computing device, a web application installed on and/or executing on a computing device, a mobile software application installed and/or executing on a mobile computing device, firmware installed and/or executing on a computer input device, or any combination thereof. For example, application 135 may include an application running on computing device 125. In some cases, a software application representative of application 135 may be installed and/or executing on computing device 125 and/or server 110. For example, application 135 may include a web browser application executing on computing device 125.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include peripheral security module 150. For example, device 105 may include application 135 that allows device 105 to interface with a separate device via peripheral security module 150 located on another device such as computing device 125 and/or server 110. In some embodiments, device 105, computing device 125, and server 110 may include peripheral security module 150 where at least a portion of the functions of peripheral security module 150 are performed separately and/or concurrently on device 105, computing device 125, and/or server 110. Likewise, in some embodiments, a user may access the functions of device 105 (directly or through device 105 via peripheral security module 150) from computing device 125. For example, in some embodiments, computing device 125 includes a mobile application that interfaces with one or more functions of device 105, peripheral security module 150, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly to computing 125 and/or or one or more network devices such as a gateway, switch, router, intrusion detection system, etc. Database 120 may include security data 165. In some cases, security data 165 may include a root certificate. In some cases, security data 165 may enable device 105, server 110, computing device 125, and/or application 135 to validate public encryption key 160. For example, device 105 may send a copy of public encryption key 160 to server 110, computing device 125, and/or application 135. In some cases, server 110, computing device 125, and/or application 135 may validate the copy of public encryption key 160 in conjunction with a root certificate included in security data 165. Upon validating the copy of public encryption key 160, server 110, computing device 125, and/or application 135 may generate a session key, encrypt the session key using the copy of public encryption key 160, and send the encrypted session key to device 105. In some cases, device 105 may decrypt the encrypted session key via private encryption key 155.

As one example, device 105 may access security data 165 in database 120 over network 115 via server 110. Security data 165 may include data regarding a security protocol associated with establishing a secure session between a computer input device and a software application. As one example, security data 165 may store an identifier associated with a computer input device such as a serial number of a computer input device and/or a media access control (MAC) address of a computer input device. In some cases, the identifier may be unique to the computer input device. In some cases, the security data 165 may store an association between the identifier of a computer input device and at least one of a security certificate, a validation tool, an encryption tool, or any combination thereof. For example, security data 165 may store an association between an identifier of the computer input device and at least one of a website security certificate, a private key certificate, a public key certificate, a secure socket layer (SSL) certificate, or any combination thereof. In some embodiments, at least one of the security certificate, validation tool, and encryption tool may be associated with the computer input device and/or a particular software application. In some cases, security data 165 may store an association between the identifier of a computer input device and at one of a security certificate, a validation tool, an encryption tool, and a particular software application, or any combination thereof. Additionally or alternatively, security data 165 may store an association between a particular software application and at one of a security certificate, validation tool, encryption tool, and an identifier of the computer input device, or any combination thereof.

In some embodiments, peripheral security module 150 may be configured to perform the systems and methods described herein in conjunction with user interface 130 and application 135. For example, peripheral security module 150 may enable secure communications between device 105 and application 135. In some cases, peripheral security module 150 may perform one or more operations in conjunction with a processor of device 105 and/or computing device 125. In some cases, user interface 130 may include an operating system installed and/or executing on computing device 125. User interface 130 may enable a user to interact with, control, and/or program one or more functions of peripheral security module 150. Further details regarding the peripheral security module 150 are discussed below.

Figure 2:
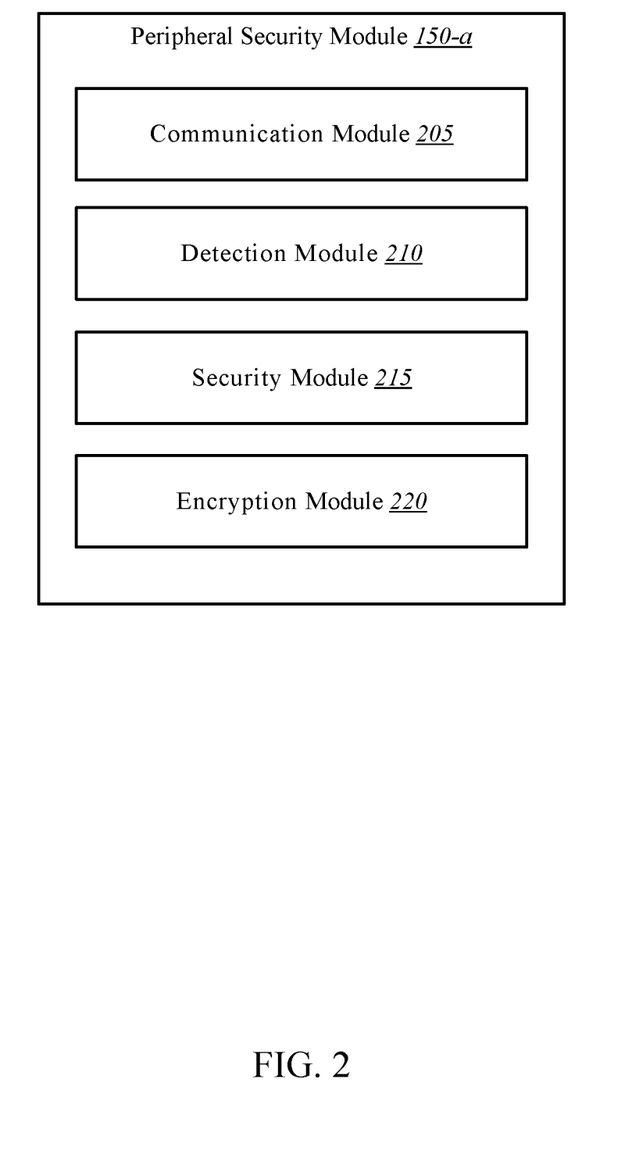
FIG. 2 is a block diagram illustrating one example of one or more modules in accordance with various aspects of this disclosure.

FIG. 2 is a block diagram illustrating one example of peripheral security module 150-a. Peripheral security module 150-a may be one example of peripheral security module 150 depicted in FIG. 1. As depicted, peripheral security module 150-a may include communication module 205, detection module 210, security module 215, and encryption module 220.

In one embodiment, communication module 205 may be configured to send to an operating system of a computing device at least one packet of data associated with a peripheral device (e.g., peripheral device 105 of FIG. 1). In some cases, the peripheral device may include any input device, output device, or input/output device connected by wire or wirelessly to a computing device. Thus, the peripheral device may be configured to receive user input and send the user input to an operating system as input data. Similarly, the peripheral device may be configured to receive output data from the computing device to which the peripheral device is connected. In some cases, the peripheral device may include a universal serial bus (USB) peripheral device connected to the computing device. Additionally or alternatively, the peripheral device may include at least one of an Institute of Electrical and Electronics Engineers (IEEE) 1394 peripheral device, a Thunderbolt peripheral device, a PS/2 peripheral device, a Bluetooth peripheral device, and a wireless USB device, or any combination thereof.

In some embodiments, the peripheral device may generate the at least one packet in conjunction with communication module 205. In some cases, the at least one packet of data may identify or report the peripheral device as two or more peripheral devices to the operating system. As one example, the at least one packet of data may identify the peripheral device at least as a default input device and a secure input device. In some cases, the default input device and/or secure input device may be referred to as virtual input devices or pseudo input devices. For example, the peripheral device may be a single physical peripheral device connected to a computing device. Upon booting the operating system of the computing device, the operating system may detect the presence of the singular physical peripheral device connected to the computing device. In some cases, the physical peripheral device may report to the operating system, via communication module 205, that the physical peripheral device is at least two separate input devices. Accordingly, the single physical peripheral device may appear to the operating system to be two or more input devices.

In some embodiments, detection module 210 may be configured to identify execution of a software application on the computing device. In some cases, the software application may be a predetermined software application. In some cases, the peripheral device, in conjunction with the detection module 210, may monitor the operating system to determine when a particular software application is initiated and enable the peripheral device to detect the execution of the particular software application. In some cases, detection module 210 may distinguish between a secure software application and an unsecure software application. In some cases, detection module 210 may maintain a list of secure software applications and/or a list of unsecure software applications. Accordingly, detection module 210 may detect when a secure software application is initialized or gains the focus of the operating system and/or may detect when an unsecure software application is initialized or gains the focus of the operating system.

In some cases, a web browser may be designated as a secure software application. Accordingly, in some embodiments, detection module 210 may detect the web browser being initialized and/or gaining the focus of the operating system and in response trigger secure peripheral communications. Additionally or alternatively, certain universal resource locator (URL) addresses may be designated as secure URLs and unsecure URLs. For instance, URLs for banking websites and/or online tax websites, as one example, may be designated as secure URLs whereas news websites may be designated as unsecure URLs. Accordingly, in some embodiments, detection module 210 may detect a secure URL and trigger secure peripheral communications based on the detection of the secure URL. Additionally or alternatively, a particular software application (e.g., desktop application, mobile application, web application, etc.) may be configured to identify itself to detection module 210 as a secure software application to trigger secure communications between the peripheral device and the particular software application.

Examples of secure software applications may be any software application determined to involve sensitive information such as identity information, name, address, social security number, information associated with bank accounts (e.g., bank name, name on account, bank account number, routing number, account balances, etc.), credit card numbers, credit card information (e.g., name on credit card, expiration date, security number, etc.), or any other sort of private or sensitive information. In some cases, detection module 210 may detect sensitive information in any software application and trigger secure peripheral communications based on the detection of the sensitive information.

In some cases, the at least one packet of data includes a first identifier used to identify the default input device and a second identifier used to identify the secure input device. For example, the at least one packet sent by the communication module 205 may include the first identifier to at least partially identify the default input device and include the second identifier to at least partially identify the secure input device. In some cases, the operating system may use the first identifier to address communication to the default input device. Similarly, in some cases, the software application may use the second identifier to address communication to the secure input device. In some cases, only one or more software applications are configured or enabled to communicate with the secure input device. In some cases, the operating system may be prevented from communicating with the secure input device. In some cases, communications between the software application and the secure input device may be established to pass directly only between the software application and the secure input device. Thus, in some cases, communications between the software application and the secure input device may bypass the operating system.

In some cases, a first interface channel or first communication channel may be established for the default input device and a second interface channel or second communication channel may be established for the secure input device. In some cases, the first interface channel may be established between the default input device and the operating system of the computing device to which the peripheral device is connected. In some cases, the second interface channel may be established between the software application and the secure input device. In some embodiments, the second interface channel may include a secure channel for encrypted communication between the software application and the secure input device.

In some embodiments, security module 215 may be configured to perform a handshake protocol between the secure input device and the software application based at least in part on the execution of the software application. In some embodiments, security module 215 may be configured to establish a secure session over a secure channel between the secure input device and the software application based at least in part on the handshake protocol. In some cases, at least one of the peripheral device and the software application generates a session key for the secure session. In some cases, a peripheral device may include a private encryption key unique to the peripheral device (e.g., private encryption key 155). In some cases, the private encryption key may be embedded in the peripheral device at the time of manufacture. In some cases, security module 215 may include a dedicated microcontroller or secure cryptoprocessor to protect the private encryption key. In some cases, security module 215 may use a trusted platform module (TPM) to securely integrate the private encryption key into the peripheral device.

In some cases, security module 215 performing the handshake protocol may include security module 215 displaying a code, receiving a user input after displaying the code, comparing the user input to the displayed code, and enabling the establishing of the secure session based at least in part on a result of comparing the user input to the displayed code. In some embodiments, the code may be displayed on a portion of a user interface of the software application or a display on the peripheral device, or both. For example, security module 215 may display the code "P8J9A7" via at least one of a user interface of the software application and/or a display on the peripheral device. Security module 215 may then listen for the code to be entered such as via the peripheral device. For example, the peripheral device may include a keyboard and a user may enter the code "P8J9A7" via the keyboard. After detecting the entry by the user, security module 215 may compare the code displayed with the code entered. Upon determining the code entered matches the code displayed, security module 215 may enable the establishing of the secure session. As another example, after detection module 210 detects a secure software application, security module 215 may send a code to a particular recipient such as a mobile device of a particular user. The user may receive the code (e.g., via a text message or email message, etc.), and then enter the received code via the peripheral. Upon determining the code entered matches the code sent to the mobile device, security module 215 may enable the establishing of the secure session.

In one embodiment, the peripheral device may include two or more drivers to enable communications with the two or more inputs devices the peripheral device reports to the operating system. For example, when the at least one packet of data identifies the peripheral device at least as a default input device and a secure input device, the peripheral device may include a default driver to enable communications with the default input device and may include a secure driver to enable communications with the secure input device.

In one embodiment, only one application may be in focus at a time on the operating system. In some cases, the in-focus application may be referred to as the active application or the active window. In some cases, the in-focus application is the application that controls input/output focus in relation to user input and the operating system and/or a software application. In some cases, a first application losing focus may include the first application being minimized. In some cases, a first application losing focus may include the first application being minimized and a second application gaining focus. In some cases, security module 215 may terminate the secure session based on at least one of terminating the software application, a predetermined session timeout, a predetermined time period of inactivity associated with the software application with which the secure session is established, or any combination thereof.

In some embodiments, upon establishing the secure session and while the software application controls focus of the operating system, security module 215 may be configured to implement a secure driver associated with the secure input device. In some cases, upon establishing the secure session and while the software application controls focus of the operating system, security module 215 may be configured to halt communications of and/or block or disable, at least temporarily, a default driver associated with the default input device. In some embodiments, upon terminating the software application or upon the software application losing the focus, security module 215 may be configured to re-enable communications with the default driver associated with the default input device. In some cases, the secure driver bypasses the operating system and communicates data directly between the software application and the secure input device. In some embodiments, upon terminating the software application or upon the software application losing the focus, security module 215 may be configured to halt communications of and/or block or disable, at least temporarily, the secure driver associated with the secure input device.

In some embodiments, with a secure session established between the software application and the peripheral device, encryption module 220 may be configured to encrypt data generated from input received by the peripheral device based at least in part on the session key. In some embodiments, communication module 205 may be configured to communicate the encrypted data over the secure channel between the secure input device and the software application. In some embodiments, encryption module 220 may be configured to encrypt the session key using a public encryption key. In some cases, at least one of the peripheral device and the software application may include a private encryption key to decrypt the encrypted session key. In one example, when the peripheral device includes the private encryption key the manufacturer of the peripheral device may provision the private encryption key on the peripheral device at the time the peripheral device is manufactured.

Figure 3:
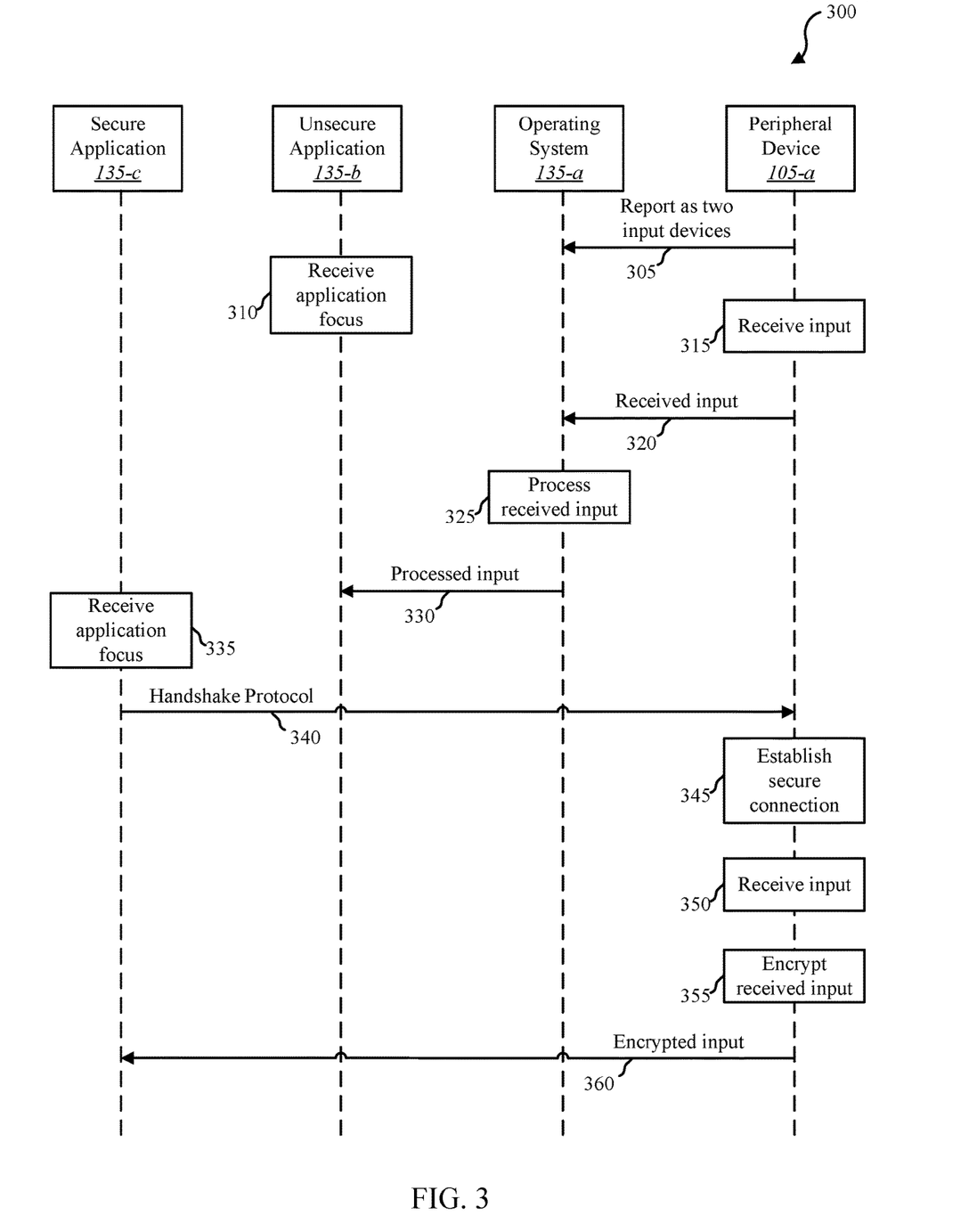
FIG. 3 shows a block diagram of a data flow in accordance with various aspects of this disclosure.

FIG. 3 shows a block diagram of a data flow 300 in accordance with various aspects of this disclosure for improving computer peripheral device security. In some configurations, the data flow 300 may be implemented in conjunction with the peripheral security module 150 illustrated in FIGS. 1 and/or 2. In some configurations, the data flow 300 may be implemented in conjunction with device 105, server 110, network 115, database 120, components thereof, or any combination thereof.

As depicted, at 305, peripheral device 105-a may report itself to operating system 135-a as at least two input devices. At block 310, unsecure application 135-b may receive application focus as the active application of operating system 135-a. Unsecure application 135-b may be initialized at block 310 or may gain focus after being initialized previous to block 310.

At block 315, peripheral device 105-a may receive input such as a user typing on a keyboard and/or a user moving/clicking a mouse. At 320, peripheral device 105-a may send the received input to operating system 135-a. At block 325, operating system 135-a may process the received input. At 330, operating system 135-a may send the processed input to the unsecure application 135-b. As a result, unsecure application 135-b may perform an operation in response to the received input. In some cases, operating system 135-a may use a default driver to communicate with peripheral device 105-a, process the received input, and send the processed input to the unsecure application 135-b.

At block 335, secure application 135-c may receive application focus as the active application of operating system 135-a. Secure application 135-c may be initialized at block 335 or may gain focus after being initialized previous to block 335. At 340, secure application 135-c may initiate communications with peripheral device 105-a according to a handshake protocol.

At block 345, peripheral device 105-a may establish a secure connection between secure application 135-c and peripheral device 105-a. After establishing the secure connection with secure application 135-c, at block 350, peripheral device 105-a may receive input such as a user typing on a keyboard and/or moving/clicking a mouse. At block 355, peripheral device 105-a may encrypt the received input according to one or more aspects of the secure connection between peripheral device 105-a and secure application 135-c. At 360, peripheral device 105-a may send the encrypted input to secure application 135-c. In some cases, secure application 135-c may decrypt the received encrypted input data according to one or more aspects of the secure connection between peripheral device 105-a and secure application 135-c.

Figure 4:
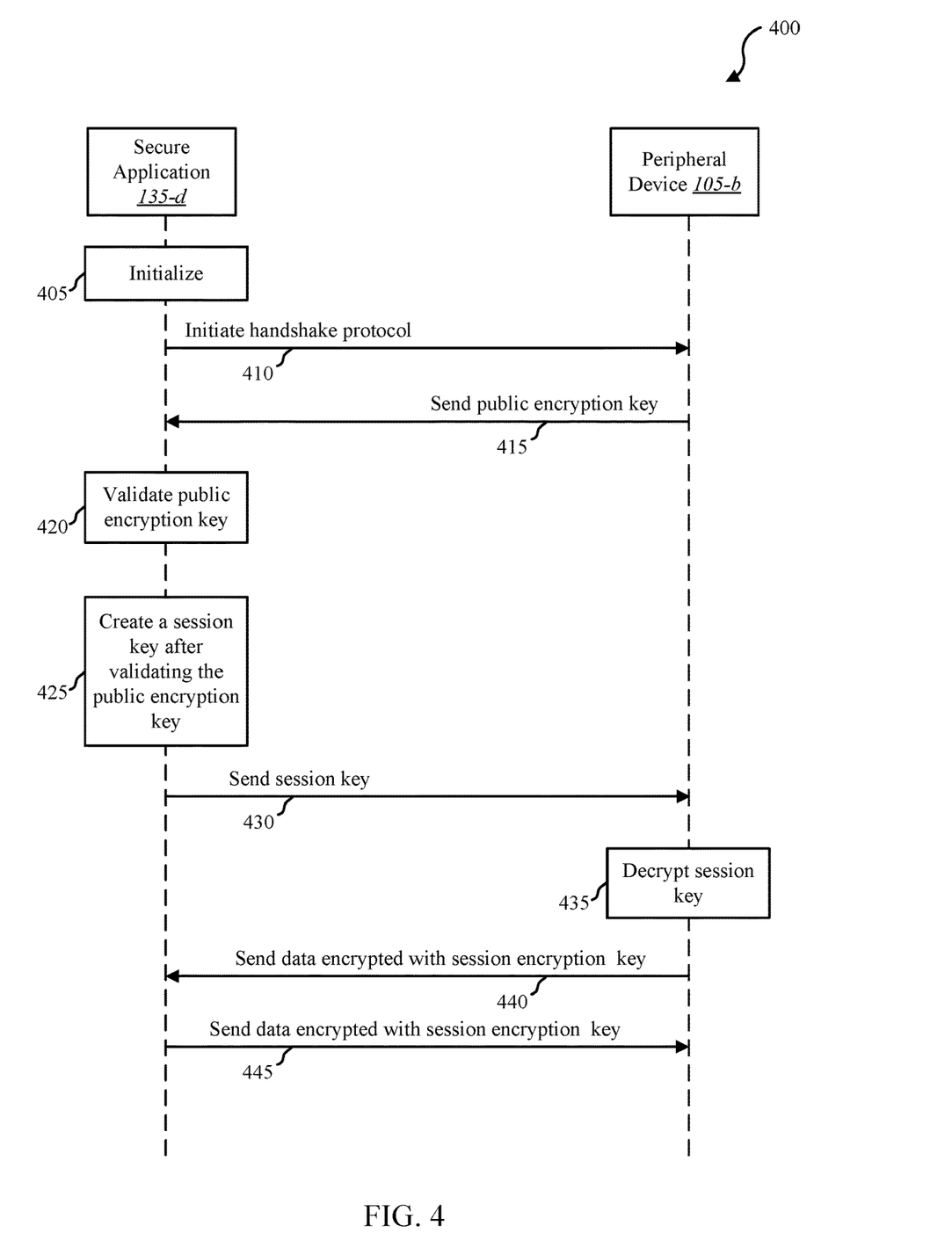
FIG. 4 shows a block diagram of a data flow in accordance with various aspects of this disclosure.

FIG. 4 shows a block diagram of a data flow 400 in accordance with various aspects of this disclosure for improving computer peripheral device security. In some configurations, the data flow 400 may be implemented in conjunction with the peripheral security module 150 illustrated in FIGS. 1 and/or 2. In some configurations, the data flow 400 may be implemented in conjunction with device 105, server 110, network 115, database 120, components thereof, or any combination thereof.

As depicted, at block 405, secure application 135-*d* may initialize. At 410, secure application 135-*d* may initiate secure communications between secure application 135-*d* and peripheral device 105-*b* according to a handshake protocol. At 415, peripheral device 105-*b* may send a public encryption key to secure application 135-*d*. At block 420, secure application 135-*d* may validate the public encryption key. In some cases, secure application 135-*d* may validate the public key locally using a root certificate provided by peripheral device 105-*b* and/or a computing device to which peripheral device 105-*b* connects. In some cases, secure application 135-*d* may validate the public key by making a call to a remote server or cloud service, for example.

At block 425, secure application 135-*d* may create a session key after validating the public encryption key. At 430, secure application 135-*d* may send the session key to peripheral device 105-*b*. In some cases, secure application 135-*d* may encrypt the session key using the public encryption key, then send the encrypted session key to the peripheral device 105-*b*. At block 435, peripheral device 105-*b* may decrypt the session key. In some cases, peripheral device 105-*b* may include a private encryption key. As one example, peripheral device 105-*b* may be provisioned with the private encryption key at the time the peripheral device 105-*b* is manufactured. Accordingly, in some cases, peripheral device 105-*b* may decrypt the encrypted session key using a private encryption key securely stored on peripheral device 105-*b*.

At 440, peripheral device 105-*b* may encrypt first data using the decrypted session key and send the encrypted first data to secure application 135-*d*. Secure application 135-*d* may use the session key it created to decrypt the encrypted first data. At 445, secure application 135-*d* may encrypt second data using the decrypted session key and send the encrypted second data to peripheral device 105-*b*. Peripheral device 105-*b* may use the decrypted session key to decrypt the encrypted second data.

Figure 5:
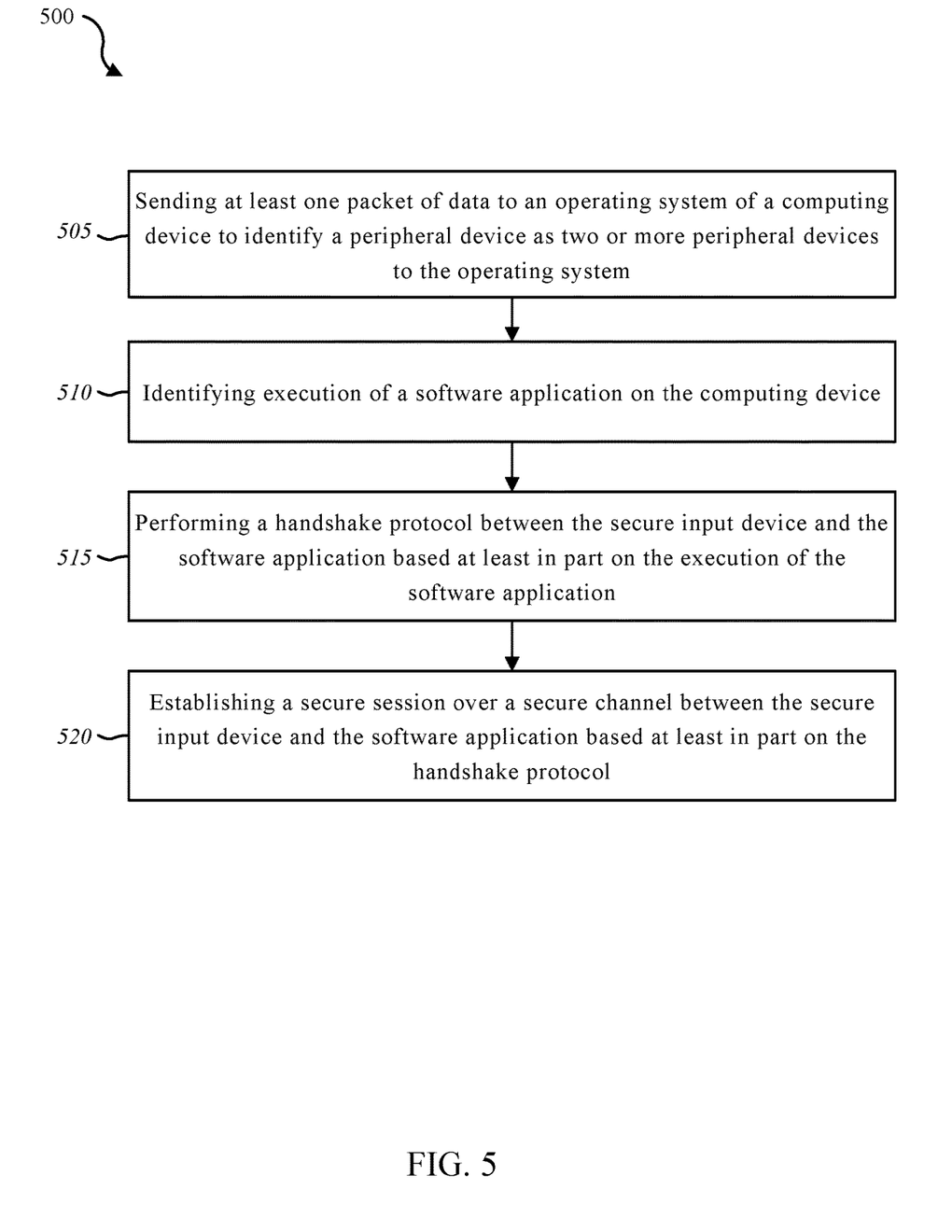
FIG. 5 is a flow diagram illustrating one embodiment of a method in accordance with various aspects of this disclosure.

FIG. 5 is a flow diagram illustrating one embodiment of a method 500 for improving computer peripheral device security. In some configurations, the method 500 may be implemented by the peripheral security module 150 illustrated in FIGS. 1 and/or 2. In some configurations, the method 500 may be implemented in conjunction with device 105, computing device 125, server 110, network 115, database 120, components thereof (e.g., a processor of a peripheral device, etc.), or any combination thereof.

At block 505, method 500 may include sending at least one packet of data to an operating system of a computing device. In some cases, the at least one packet of data may identify the peripheral device to the operating system as two or more peripheral devices. As one example, the at least one packet of data may identify the peripheral device at least as a default input device and a secure input device.

At block 510, method 500 may include identifying execution of a software application on the computing device. At block 515, method 500 may include performing a handshake protocol between the secure input device and the software application based at least in part on the execution of the software application. At block 520, method 500 may include establishing a secure session over a secure channel between the secure input device and the software application based at least in part on the handshake protocol.

Figure 6:
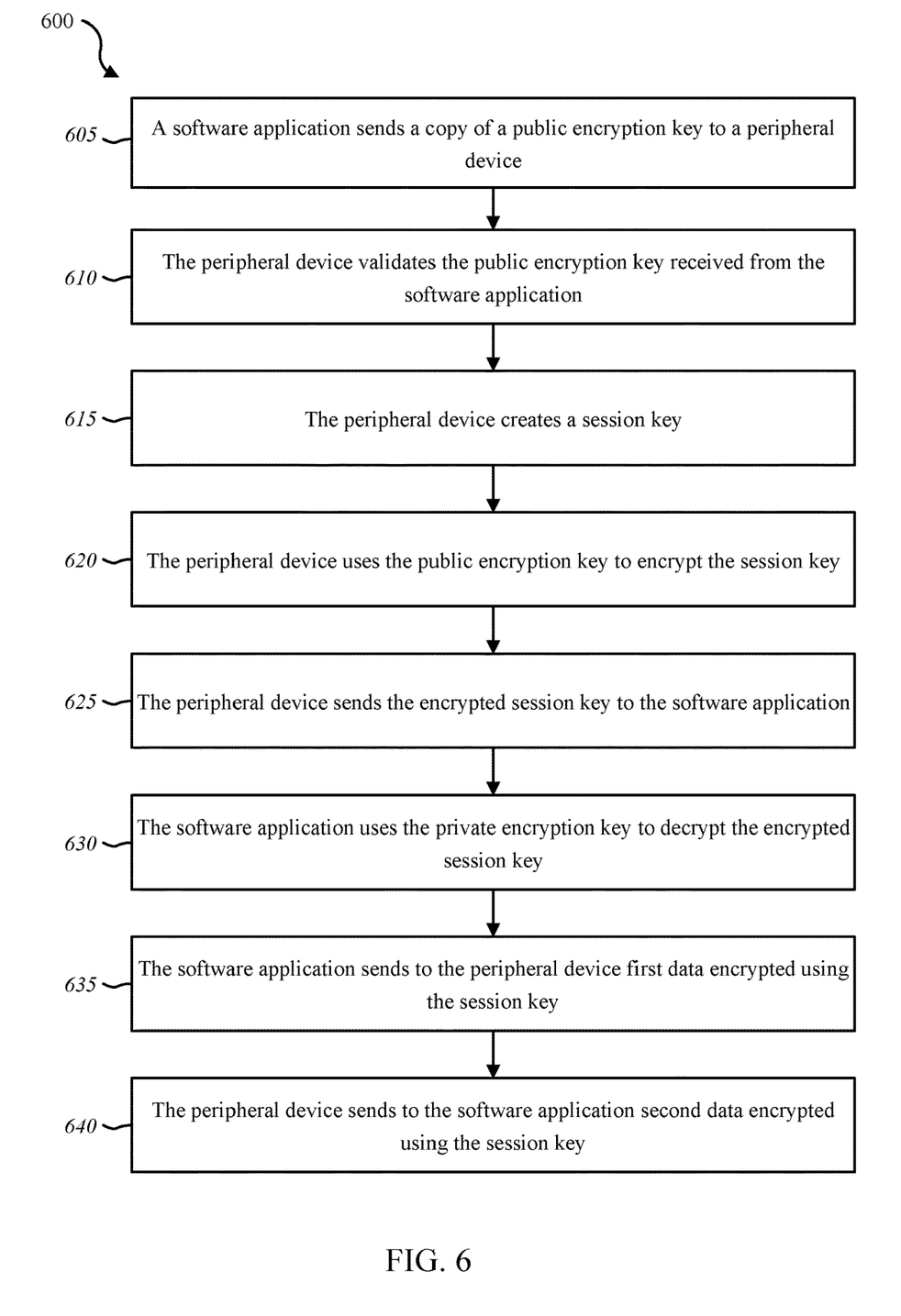
FIG. 6 is a flow diagram illustrating one embodiment of a method in accordance with various aspects of this disclosure.

FIG. 6 is a flow diagram illustrating one embodiment of a method 600 for improving computer peripheral device security. In some configurations, the method 600 may be implemented by the peripheral security module 150 illustrated in FIG. 1 or 2. In some configurations, the method 600 may be implemented in conjunction with device 105, computing device 125, server 110, network 115, database 120, components thereof (e.g., a processor of a peripheral device, etc.), or any combination thereof.

At block 605, method 600 may include a software application (e.g., application 135 of FIG. 1) sending a copy of a public encryption key to a peripheral device (e.g., peripheral device 105 of FIG. 1) after a connection between the software application and the peripheral device is established. The established connection may be initiated by either the software application or the peripheral device. At block 610, method 600 may include the peripheral device validating the public encryption key received from the software application. In some cases, the peripheral device may validate the public encryption key based on a root certificate saved locally on the computing device to which the peripheral device connects. Additionally or alternatively, the peripheral device may validate the public encryption key by making a call to an external server or cloud service and receiving a response indicating whether the public encryption key is validated.

At block 615, method 600 may include the peripheral device creating a session key. At block 620, method 600 may include the peripheral device using the public encryption key to encrypt the session key. At block 625, method 600 may include the peripheral device sending the encrypted session key to the software application. At block 630, method 600 may include the software application using the private encryption key to decrypt the encrypted session key. At block 635, method 600 may include the software application sending to the peripheral device data encrypted using the session key. In some cases, the peripheral device decrypts the encrypted data received from the software application using the session key. At block 640, method 600 may include the peripheral device sending to the software application data encrypted using the session key. In some cases, the software application decrypts the encrypted data received from the peripheral device using the session key.

Figure 7:
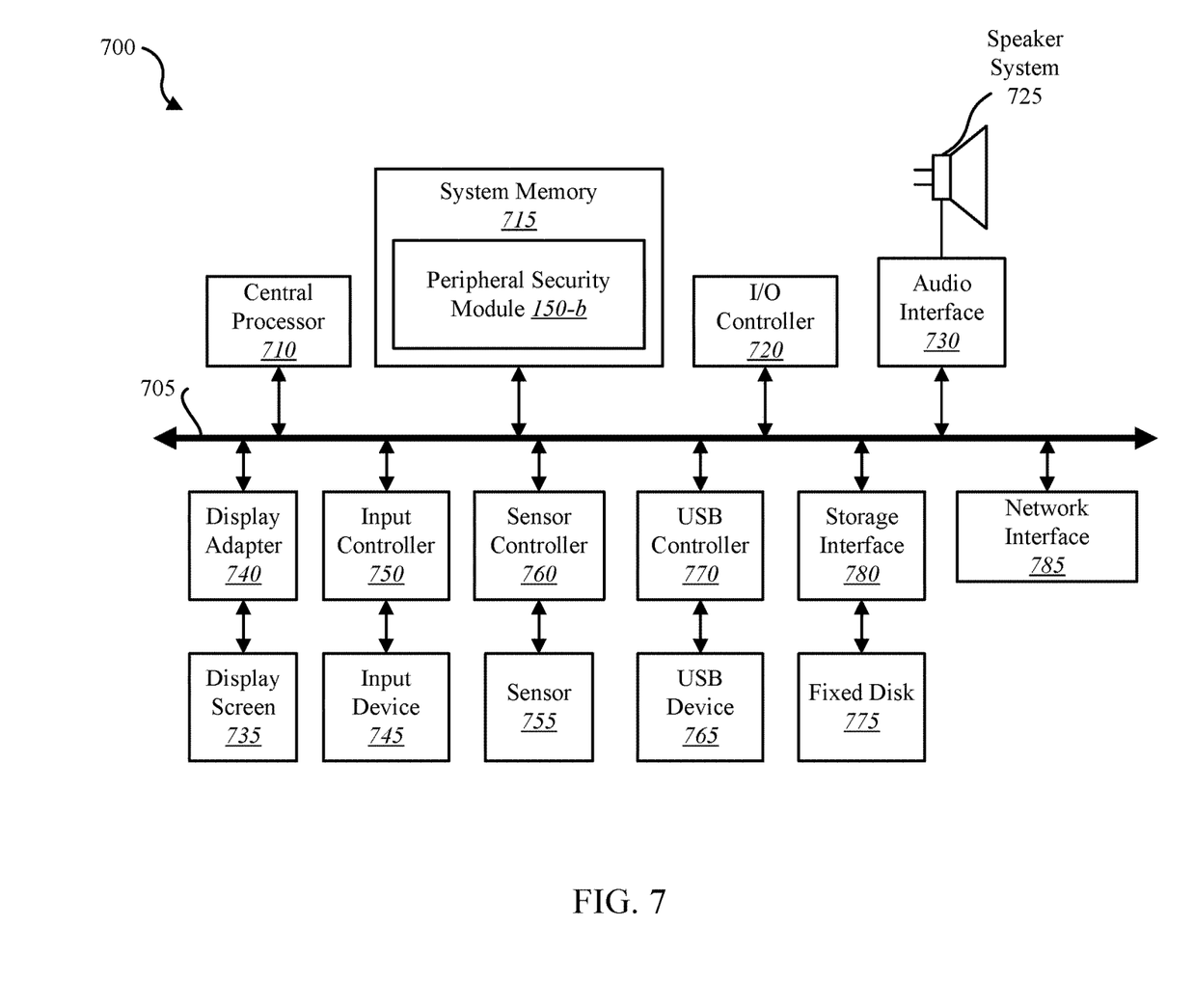

FIG. 7 depicts a block diagram of a computing device 700 suitable for implementing the present systems and methods. The device 700 may be an example of at least one of device 105, computing device 125, and server 110, or any combination thereof, from FIG. 1. In one configuration, device 700 includes a bus 705 which interconnects major subsystems of device 700, such as central processor 710, system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., keyboard, mouse, joystick, touchpad, remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

In some cases, device 700 may be an example of at least one component or one part of device 105, computing device 125, and/or server 110. For example, central processor 710 may be representative of a processor of device 105, computing device 125, or server 110. Similarly, system memory 715 may be representative of memory in device 105, computing device 125, or server 110. In some embodiments, at least one of input controller 750, input device 745, USB controller 770, USB device 765, sensor controller 760, sensor 755, display adapter 740, display screen 735, I/O controller 720, storage interface 780, fixed disk 775, audio interface 730, speaker system 725, and network interface 785, or any combination thereof may be an example of device 105.

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the peripheral security module 150-*b* to implement the present systems and methods may be stored within the system memory 715. Applications (e.g., application 135) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 720 may operate in conjunction with network interface 785 and/or storage interface 780. The network interface 785 may enable system 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fibre Channel adapter. Storage interface 780 may enable system 700 to access one or more data storage devices. The one or more data storage devices may include two or more data tiers each. The storage interface 780 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for improving security of peripheral devices, comprising:
   identifying, by a processor of a computing device, execution of a software application at the computing device;
   determining that the software application is a secure software application based at least in part on a list of secure software applications including the software application;
   generating, by the software application at the computing device, a code, wherein generating the code is based at least in part on determining that the software application is a secure software application;
   displaying, by the processor of the computing device, the code based at least in part on the generating;
   receiving, by the processor, a user input after displaying the code;
   comparing, by the processor, the user input to the displayed code;
   determining, based at least in part on the comparing, that the user input and the displayed code match; and
   establishing, by the processor, secure communications between a peripheral device and the software application at the computing device based at least in part on a result of the comparing the user input to the displayed code and determining that the user input and the displayed code match.

2. The method of claim 1, wherein displaying the code further comprises:
   displaying the code on a portion of a user interface of the software application displayed on a display of the computing device, instructing the peripheral device to display the code on a display of the peripheral device, sending the code to a designated remote device, or any combination thereof.

3. The method of claim 1, wherein receiving the user input further comprises:
   receiving the user input via the peripheral device.

4. The method of claim 1, further comprising:
   initiating the software application.

5. The method of claim 1, further comprising:
   listening, based at least in part on displaying the code, for the user input, wherein receiving the user input is based at least in part on the listening.

6. The method of claim 1, wherein the peripheral device includes a universal serial bus (USB) peripheral device connected to the computing device.

7. The method of claim 1, further comprising:
   determining a non-secure software application gains focus of an operating system of the computing device; and
   implementing default communications between the peripheral device and the computing device while the non-secure software application has the focus of the operating system, the default communications including unencrypted communications, the secure communications including encrypted communications.

8. A computing device configured for improving security of peripheral devices, comprising:
   a processor;
   memory in electronic communication with the processor; and
   instructions stored in the memory, the instructions being executable by the processor to:
      identify, by the processor of the computing device, execution of a software application at the computing device;
      determine that the software application is a secure software application based at least in part on a list of secure software applications including the software application;
      generate, by the software application, a code, wherein generating the code is based at least in part on determining that the software application is a secure software application;
      display the code based at least in part on the generating;
      receive a user input after displaying the code;
      compare the user input to the displayed code;
      determine, based at least in part on the comparing, that the user input and the displayed code match; and
      establish secure communication between a peripheral device and the software application at the computing device based at least in part on a result of the comparing the user input to the displayed code and determining that the user input and the displayed code match.

9. The device of claim 8, wherein the instructions executable by the processor to display the code are further executable by the processor to:
 display the code on a portion of a user interface of the software application displayed on a display of the computing device, instruct the peripheral device to display the code on a display of the peripheral device, send the code to a designated remote device, or any combination thereof.

10. The device of claim 8, wherein the instructions executable by the processor to receive the user input are further executable by the processor to:
 receive the user input via the peripheral device.

11. The device of claim 8, wherein the instructions are executable by the processor to:
 initiate the software application.

12. The device of claim 8, wherein the instructions are executable by the processor to:
 listen, based at least in part on displaying the code, for the user input, wherein receiving the user input is based at least in part on the listening.

13. The device of claim 8, wherein the peripheral device includes a universal serial bus (USB) peripheral device connected to the computing device.

14. The device of claim 8, wherein the instructions are executable by the processor to:
 determine a non-secure software application gains focus of an operating system of the computing device; and
 implement default communications between the peripheral device and the computing device while the non-secure software application has the focus of the operating system, the default communications including unencrypted communications, the secure communications including encrypted communications.

15. A computer-program product for improving security of peripheral devices, the computer-program product comprising a non-transitory computer-readable medium storing instructions thereon, the instructions being executable by a processor of a computing device to:
 identify, by the processor of the computing device, execution of a software application at the computing device;
 determine that the software application is a secure software application based at least in part on a list of secure software applications including the software application;
 generate, by the software application, a code, wherein generating the code is based at least in part on determining that the software application is a secure software application;
 display the code based at least in part on the generating;
 receive a user input after displaying the code;
 compare the user input to the displayed code;
 determine, based at least in part on the comparing, that the user input and the displayed code match; and
 establish secure communication between a peripheral device and the software application at the computing device based at least in part on a result of the comparing the user input to the displayed code.

16. The computer-program product of claim 15, wherein the instructions executable by the processor to display the code are further executable by the processor to:
 display the code on a portion of a user interface of the software application displayed on a display of the computing device, instruct the peripheral device to display the code on a display of the peripheral device, send the code to a designated remote device, or any combination thereof.

\* \* \* \* \*